US011280408B2

(12) United States Patent
Mang et al.

(10) Patent No.: US 11,280,408 B2
(45) Date of Patent: Mar. 22, 2022

(54) LOCKING UNIT WITH CENTRE PIECE

(71) Applicant: SVM Schultz Verwaltungs-GmbH & Co. KG, Memmingen (DE)

(72) Inventors: Helmut Mang, Memmingen (DE); Florian Hölzle, Illertissen (DE); Martin Kächler, Memmingen (DE); Wolfgang Schütz, Memmingen (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 23 days.

(21) Appl. No.: 16/714,123

(22) Filed: Dec. 13, 2019

(65) Prior Publication Data

US 2020/0191267 A1   Jun. 18, 2020

(30) Foreign Application Priority Data

Dec. 14, 2018  (DE) .......................... 102018132354.9
May 29, 2019  (DE) .......................... 102019114559.7

(51) Int. Cl.
*F16H 63/34* (2006.01)

(52) U.S. Cl.
CPC ..... *F16H 63/3416* (2013.01); *F16H 63/3483* (2013.01); *F16H 63/3475* (2013.01)

(58) Field of Classification Search
CPC .............. F16H 63/3483; F16H 63/3458–3475
See application file for complete search history.

(56) References Cited

U.S. PATENT DOCUMENTS

| 5,967,921 A * | 10/1999 | Simpson .................. F16H 7/08 474/110 |
| 6,471,027 B1 * | 10/2002 | Gierer ................ F16H 63/3433 188/31 |
| 7,410,038 B2 * | 8/2008 | Kleinert ............. F16H 63/3475 188/300 |
| 9,476,431 B2 | 10/2016 | Heubner et al. |
| 2014/0123799 A1 | 5/2014 | Landino et al. |
| 2015/0008092 A1 | 1/2015 | Mang et al. |
| 2016/0244031 A1 | 8/2016 | Kidokoro et al. |
| 2020/0248806 A1 * | 8/2020 | Klein .................. F16H 63/3483 |

FOREIGN PATENT DOCUMENTS

| DE | 102010029400 A1 | 12/2011 |
| DE | 102011107263 A1 | 1/2013 |
| DE | 102013213678 A1 | 1/2015 |
| DE | 102015008708 A1 | 1/2016 |

(Continued)

OTHER PUBLICATIONS

German Search Report for Application No. 102019114559.7 dated Feb. 4, 2020 (6 pages).

(Continued)

*Primary Examiner* — Ernesto A Suarez
*Assistant Examiner* — James J Taylor, II
(74) *Attorney, Agent, or Firm* — Reising Ethington, P.C.

(57) ABSTRACT

The disclosure relates to a locking unit, in particular for the parking lock of an automatic transmission, for locking the movement of a piston which is movable by a drive and in particular can be acted upon with pressure or hydraulic pressure, wherein the piston is at least partially mounted in a center section which is at least partially surrounded by a housing.

10 Claims, 7 Drawing Sheets

(56) References Cited

FOREIGN PATENT DOCUMENTS

DE      102015006323  A1  *  11/2016   ......... F16H 63/3483
DE      102016101591  A1      8/2017
WO      WO2013131926  A1      9/2013

OTHER PUBLICATIONS

European Search Report for European Application No. 19216286.5 dated Feb. 19, 2020 (8 pages).
European Office Action for European Application No. 19216286.5 dated Mar. 3, 2021 (5 pages).

* cited by examiner

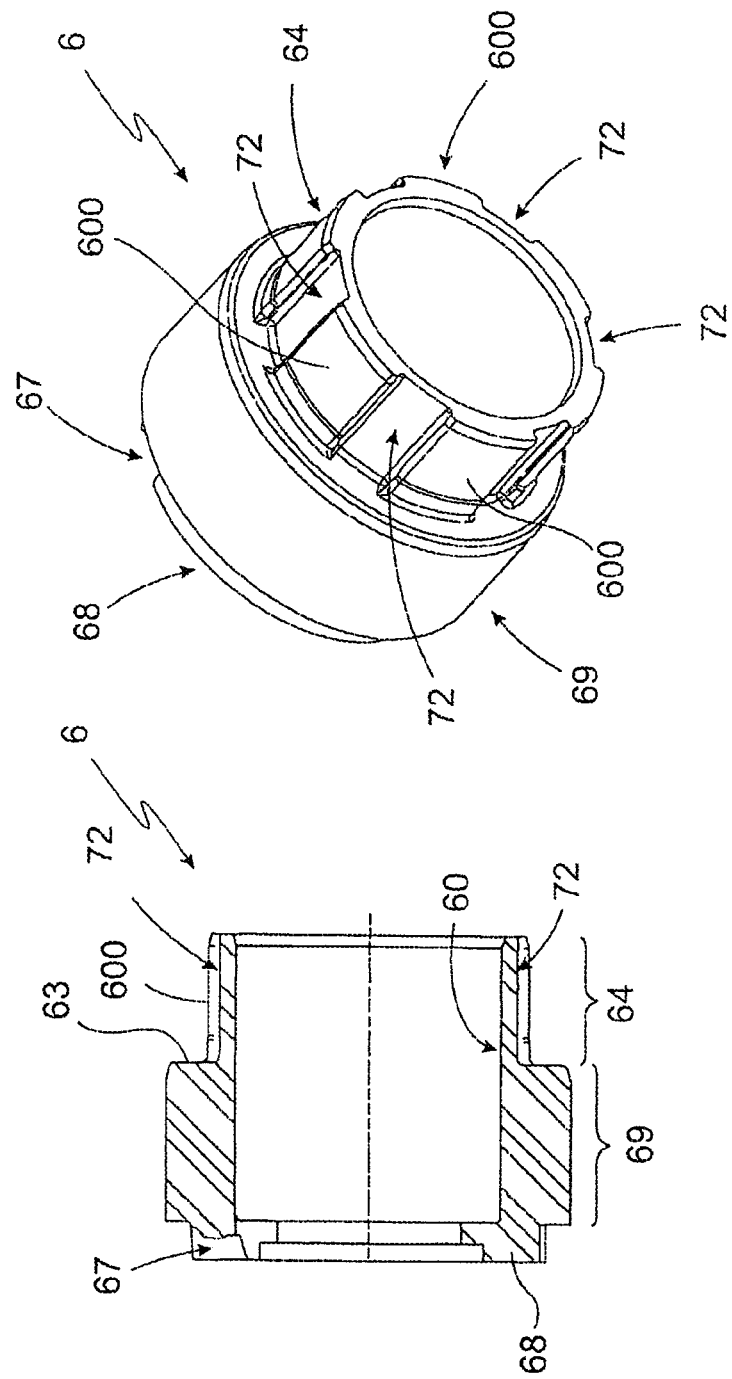

LOCKING UNIT WITH CENTRE PIECE

INTRODUCTION

The disclosure relates to a locking unit, in particular for the parking lock of an automatic transmission, for locking the movement of a piston which is movable by a drive and in particular can be acted upon with pressure or hydraulic pressure, the locking unit having a solenoid and at least one latching element, and the latching element interacting with the armature or the armature rod of the solenoid, and the piston having at least one latching receptacle, and the piston being securable by the retaining interaction of the latching element with the latching receptacle.

SUMMARY

It is an object of the disclosure, per an embodiment, to design a known locking unit in an alternative or better manner.

The disclosure, per an embodiment, relates to a locking unit, in particular for the parking lock of an automatic transmission, for locking the movement of a piston which is movable by a drive and in particular can be acted upon with pressure or hydraulic pressure, the locking unit having a solenoid and at least one latching element, and the latching element interacting with the armature or the armature rod of the solenoid, and the piston having at least one latching receptacle, and the piston being securable by the retaining interaction of the latching element with the latching receptacle.

According to an embodiment of the disclosure, it is provided that the piston is at least partially mounted in a center section which is at least partially surrounded by a housing, and the locking unit has a latching unit, which supports the latching elements, wherein the latching unit and the center section (6) are formed integrally. It has been shown that this leads to an advantageous operation, according to an embodiment, and permits a high degree of stability and is simple to manufacture.

The center section can in particular be designed in the manner of a sleeve.

An inner side of the center section, per an embodiment, preferably forms a bearing surface for the piston or for a piston thrust piece of the piston. The piston can thereby be advantageously mounted.

The center section can be in the form in particular of a turned part or sintered shaped part, can be produced in a formative method or can be produced by means of 3D printing, metal powder injection molding, selective laser melting or selective laser sintering. Such methods have proven advantageous. However, other methods are also possible.

The center section, per an embodiment, preferably has an axial length of 100% to 200% or of 130% to 170% of a stroke of the piston.

The center section furthermore, per an embodiment, preferably has an axial length of 30% to 40% of an axial length of the piston.

The center section furthermore, per an embodiment, preferably has an axial length of 13% to 20% of an axial length of the locking unit.

According to an embodiment, it is provided that the piston is hollow on the inside completely along its axial extent. Weight can thereby be saved.

In particular, it can be provided that the piston has a cavity which extends axially though the entire piston.

The cavity is, per an embodiment, preferably open at both axial ends.

It is provided, per an embodiment, that the cavity has a wall continuously or in sections which is thinner than a quarter of a diameter of the piston or is thinner than a tenth of the diameter of the piston.

According to an embodiment, it is provided that the piston has a completely hollow piston tube along one axial portion and a piston thrust piece, which is connected to the piston tube, along a further axial portion. As a result, piston tube and piston thrust piece can be optimized separately from each other in accordance with their respective functions.

The latching receptacles are, per an embodiment, preferably formed in the piston thrust piece. The piston thrust piece is preferably closer to the solenoid and more solid than the piston tube.

The piston tube can be in the form in particular of a deep drawn part, from tool steel or from metal. However, other embodiments are also possible.

According to an embodiment, it is provided that the piston tube has a wall thickness of 5% to 15% of the diameter of the piston tube.

It is preferably, per an embodiment, provided that the piston is at least partially mounted or arranged in the housing.

According to an embodiment, it is provided that the housing is at least partially, preferably completely, formed from plastic. This has proven advantageous, in particular because of the easy processability and the low weight. However, other materials are also possible.

The piston tube, per an embodiment, preferably has a tube center section with an outer tapering, wherein the tapering of the piston tube interacts with a step formed in the housing, in order to limit a movement of the piston away from the solenoid. Said movement can thereby be limited simply and reliably.

In particular, per an embodiment, a piston spring can be provided between housing and piston, said piston spring pushing the piston in the direction of the solenoid. The piston can thereby be pretensioned into an inoperative position which it takes up in particular in the absence of an active actuation, i.e., for example, in the absence of a pressurized fluid and if blocking is absent.

According to an embodiment, it is provided that the piston is mounted opposite the solenoid in a plain bearing of the housing. This permits reliable guidance of the piston.

The housing or the locking unit can have an inner tube section.

The inner tube section can be considered in general to be part of the locking unit or part of the housing.

In particular, per an embodiment, a pressure conducting channel can be formed on the outer side of the tube section. A pressurized medium can flow into said pressure conducting channel in order to actuate the piston. For example, by means of a tightness, described further below, between tube section and housing, the medium can be conducted to a position at which it is required for driving the piston.

The pressure conducting channel is preferably, per an embodiment, hydraulically connectable from the outside via a connection through the housing. This makes it possible to supply pressurized fluid.

The center section preferably, per an embodiment, has a radial outer side which supports the housing. This permits a reliable connection between housing and center section.

The center section can be connected to a solenoid housing of the solenoid. This permits a secure reference between the two components.

The center section can have an encircling contact shoulder on its side facing away from the solenoid and/or facing the piston tube, which contact shoulder is adjoined by an annular and/or conical connecting region.

According to an embodiment, it is provided that the connecting region supports the tube section. The tube section can thereby be reliably fastened.

A number of segment interspaces as notches can be formed in the connecting region, in particular, per an embodiment, radially on the outer side. As a result, for example, a passage of fluid can be made possible.

The segment interspaces are preferably, per an embodiment, designed as a fluidic connection between pressure conducting channel and a pressure space within the tube section. This makes it possible to conduct pressure out of the pressure conducting channel into the pressure space.

Respective supporting segments which support the tube section can be formed between the segment interspaces. This permits a secure connection to the tube section. The connecting region can be designed in particular as a crown ring.

According to an embodiment, it is provided that the locking unit has a latching unit which supports the latching elements.

The latching unit can have a portion facing the solenoid or an armature space of the solenoid and a portion facing the piston, which portions are both of sleeve-shaped design.

It is preferably provided, per an embodiment, that that portion of the latching unit which faces the solenoid partially accommodates the armature in at least one end position.

An interior space which is open on the piston side is preferably, per an embodiment, formed in the latching unit or in that portion of the latching unit which faces the piston.

An exterior space can be formed between latching unit and housing or between latching unit and center section.

Exterior space and interior space can be fluidically connected via an equalizing opening formed in the latching unit. This can permit an equalization of the pressure.

It is preferably provided, per an embodiment, that the exterior space is vented by a channel which is formed in or on the center section. The exterior space can thereby be kept at ambient pressure. The interior space can therefore also be kept at ambient pressure by means of the equalizing opening which has already been mentioned.

The latching unit is preferably, per an embodiment, fixedly connected directly or indirectly to the housing. This permits a constant positional relationship.

In particular, per an embodiment, a control element which is fixedly connected to the armature rod can be arranged in the latching unit. Said control element can serve for actuating the latching elements.

The control element is preferably, per an embodiment, at least partially movable within the portion facing the piston.

According to an embodiment, it is provided that a number of radial bores for receiving the latching elements is formed in the latching unit. The latching elements can thereby be reliably guided.

The latching elements can be formed spherically. However, other shapes are also possible.

The control element can be designed in order, at least in one position, to push the latching elements radially outward. They can thereby deploy a blocking effect.

It is preferably provided, per an embodiment, that the latching elements, when they are pushed radially outward, come into engagement with one of the latching receptacles. As a result, they can block a movement of the piston.

The piston preferably, per an embodiment, has at least two latching receptacles spaced apart axially from one another. This permits blocking of the piston in at least two positions. However, the use of more than two latching receptacles is also possible.

The piston is furthermore, per an embodiment, preferably lockable in two different positions by means of the two latching receptacles. Accordingly, if there are more than two latching receptacles, it is also possible for there to be locking in more than two positions.

The solenoid can have a solenoid core which is arranged at an axial end of the locking device.

The armature rod is, per an embodiment, preferably guided in a bore of the solenoid core. This permits reliable guidance of the armature rod.

The piston preferably, per an embodiment, has an axially end-side connecting region which protrudes out of the housing even when the piston is fully retracted. This permits a simple connection of an external element to the piston.

The connecting region can be designed in the manner of a fork. This permits an advantageous fastening of typical external elements. The connecting region can also be designed as a punched-out fork head.

According to an embodiment, it is provided that the piston or the piston thrust piece is at least partially arranged radially between latching unit and housing or is arranged between latching unit and center section.

The solenoid preferably, per an embodiment, has a winding for generating a magnetic field for moving the armature and/or the armature rod. This permits a simple actuation.

The inner tube section, per an embodiment, is preferably designed as a guide of the piston. The guide on the tube section achieves particularly good guidance of the piston, and therefore the latter can be moved in as smooth-running a manner as possible.

The pressure conducting channel is, per an embodiment, preferably limited at least partially radially, with respect to the longitudinal axis of the piston, on the inside by the outer side of the tube section and on the outside by the inner wall of the housing.

The tube section can be connected to the housing or can be part of the housing.

The piston preferably, per an embodiment, lies against the tube section. This permits advantageous guidance of the piston along the tube section. The contact can take place along a full circumference.

It is preferably provided, per an embodiment, that the piston slides along the tube section.

According to an embodiment, the piston lies in a fluid-tight manner against the tube section. The piston can thereby be advantageously actuated by pressure.

The piston preferably, per an embodiment, has a sealing means which seals the piston in a fluid-tight manner on the tube section. This permits a particularly leakproof design.

The sealing means can be, for example, a sealing ring or an O ring. The sealing ring or the O ring can be provided in an encircling step of the piston.

The sealing ring or the O ring is, per an embodiment, preferably provided in a piston thrust piece of the piston.

The inner side of the tube section, per an embodiment, preferably forms a housing inner wall against which the piston lies.

The tube section is, per an embodiment, preferably of rectilinear and/or cylindrical design at least along a portion on which the piston is guided. This permits an advantageous interaction with the piston.

The tube section is, per an embodiment, preferably formed from metal or from plastic. These materials have proven advantageous. However, the use of other materials is also possible.

According to an embodiment, it is provided that the center section is designed in the axial direction, with respect to the longitudinal axis of the piston, to be shorter on the piston side than the latching unit and in particular the radial bores of the latching unit are not concealed in the radial direction, with respect to the longitudinal axis of the piston, by the center section.

According to an embodiment, it is provided that the inner tube section is connected in a fluid-tight manner to the housing.

The effect which can be achieved in an advantageous manner by such a fluid-tight embodiment is that leakage between tube section and housing is prevented. Such leakage could lead, for example, to pressurized fluid escaping into a space in which it could prevent the movement of the piston.

According to an embodiment, it is provided that the tube section is accommodated in a groove of the housing. This makes reliable holding possible.

The groove of the housing can be of annular design. It can therefore be advantageously adapted to a cylindrical tube section.

According to an embodiment, it is provided that a seal is arranged between housing and tube section. A sealing effect can therefore be achieved.

The seal can be arranged in particular in the groove. It can be an O ring or sealing ring. The seal can also be a sealing material or a silicone sealing material. Such embodiments have proven advantageous.

According to an embodiment, it is provided that a number of bores in which engagement parts of the housing engage is formed in the tube section. An advantageous fastening and/or sealing, per an embodiment, can thereby be achieved. The engagement parts can be formed in particular in an internally bonded manner with the rest of the housing. They can be produced, for example, by insert molding of the tube section during production of the housing.

According to an embodiment, it is provided that the housing has an in particular annular projection which partially engages around the tube section. The tube section can therefore be held and also sealed.

The projection can limit the groove in particular radially on the inner side.

According to an embodiment, it is provided that the tube section is connected to the housing in a gas-tight and/or pressure-tight manner. Tightness going beyond the fluid tightness can thereby be achieved.

According to one embodiment, the housing can support the tube section. This permits an exact positional relationship between tube section and housing.

According to one embodiment, latching unit and center section can be produced or formed integrally as an integral injection molded part or in an additive manufacturing method. A number of radial recesses, in particular bores, can therefore also be formed in the latching unit for receiving the latching elements.

Center section and latching unit can be formed in particular integrally. The center section can be designed in the axial direction, with respect to the longitudinal axis of the piston, to be shorter on the piston side than the latching unit. In particular, it can be provided that the radial bores of the latching unit are not concealed in the radial direction, with respect to the longitudinal axis of the piston, by the center section. This permits formation of the bores by tools, such as drills, which can be guided past the center section.

The disclosure furthermore relates to a method for producing a locking unit according to the disclosure, wherein the tube section is provided and the housing is insert molded around the tube section. By means of such a method, the housing can be produced and connected to the tube section in a simple manner. With regard to the locking unit, recourse can be made to all of the embodiments and variants described herein.

According to an alternative method procedure, a groove into which the tube section is introduced subsequently can be formed in the housing.

A number of bores can be formed in the tube section, wherein a number of engagement parts which each engage in a bore have been or are formed in the housing. This permits a reliable connection. The engagement parts can be formed in particular in a materially bonded manner with the rest of the housing.

For example, it can be provided that the piston is hollow on the inside.

The piston according to the aforementioned prior art is a complicated turned part which is produced in a production process comprising a plurality of different machining steps. An aspect of a hollow design is focused on producing the individual components in simple production methods. The proposed piston can be provided as a deep drawn part in which the relatively complex contour of said piston is realized in one processing step. In addition to the significantly more favorable production, the mass of such a piston can be reduced at the same time, which overall reduces the mass of the locking unit proposed according to the disclosure, which firstly saves on resources and secondly also permits the drives which are to be used to be realized in smaller form, with the same dynamic properties, and thus also to be more cost-effective and also lighter.

According to one embodiment, it can also be provided that the piston is at least partially mounted in a housing which is at least partially formed from plastic.

The housing according to the aforementioned prior art is also a complicated, cylindrical metal turned part, the inner side of which is manufactured with high precision.

In an embodiment proposed herein, the housing can be composed, for example, of plastic, wherein the plastic, for example, is sprayed onto the structure, or the housing is kept as a finished injection molded component in which the individual parts of the locking unit according to an embodiment of the disclosure are then installed. The proposal according to an embodiment of the disclosure comprises in this case both a direct mounting of the piston on the plastic, wherein then, for example, the inner side of the plastics housing can have a corresponding wear-reducing sliding configuration, such as, for example, a sliding coating or the like, and also an indirect mounting of the piston in the housing formed from plastic. For example, in the case of the indirect mounting in the plastics housing, a corresponding guide sleeve, preferably composed of metal, or a guide tube can thus be provided, the inner side of which interacts with the outer side of the piston.

The plastics housing which can be realized as an injection molded part or as an insert molded part can be produced more simply and therefore more cost-effectively than the submissions from the prior art. The proposal is also not only limited here to the more favorable manner of production, but in turn reduces the mass of the entire locking unit since a lighter material is used for the housing.

It can also be provided that the piston is, per an embodiment, at least partially mounted in a center section which is at least partially surrounded by a housing.

This variant has the advantage, per an embodiment, that the piston is first of all guided only on the center section. A guide in the housing can be dispensed with here, but it may also be additionally provided. According to this proposal, the housing can be a component which is separate from the center section and can then be optimized in accordance with other aspects since it, for example, no longer primarily has the task of supporting the piston. Since the housing is relatively large, it can then be manufactured from a lighter material (e.g. plastic) than the material of the center section which takes on the supporting tasks and therefore is preferably composed, per an embodiment, for example, of a corresponding metallic bearing material.

In an embodiment of the proposal, it is provided that the piston is divided in two and has a hollow, for example deep drawn, piston tube and a piston thrust piece designed, for example, as a turned part.

In an embodiment of the proposal, it is provided that the piston, in particular the piston tube, is of fork-like design at its outer end.

In an embodiment of the proposal, it is provided that the piston, preferably the piston thrust piece, has two latching receptacles which are offset axially with respect to each other.

In an embodiment of the proposal, it is provided that at least part of the piston, preferably the entire piston, is designed as a deep drawn part.

In an embodiment of the proposal, it is provided that the housing which is manufactured from plastic includes or surrounds a sleeve section or tube section.

In an embodiment of the proposal, it is provided that the outer side of the tube section limits a pressure conducting channel.

In an embodiment of the proposal, it is provided that the sleeve section or tube section is placed or pressed onto a center section.

In an embodiment of the proposal, it is provided that the inner side of the sleeve section or tube section forms a mounting for the piston or the piston tube.

In an embodiment of the proposal, it is provided that a venting channel is provided on the center section, preferably on the side facing the solenoid.

In an embodiment of the proposal, it is provided that the piston spring is located within or outside the center part.

In an embodiment of the proposal, it is provided that the center section is in the form of a sintered shaped part or is manufactured in a formative method, in particular by means of 3D printing, metal powder injection molding, selective laser melting or selective laser sintering. Sintering or formative manufacturing are cost-effective production methods with which, in addition, workpieces of virtually any shape can be produced in a single working cycle.

In an embodiment of the proposal, it is provided that the center part permits a radial orientation of the latching unit.

Furthermore, the disclosure also comprises the use of the locking unit in a parking lock of an automatic transmission. However, this is not the sole application of the proposed locking unit. It can be used wherever the position of a component moving axially, i.e. parallel to its longitudinal extent, is to be defined, i.e. is to be locked.

In this connection, it is emphasized in particular that all of the features and properties, but also procedures described with respect to the device can expediently also be transferred in respect of the drafting of the method according to the disclosure and can be used within the meaning of the disclosure and are considered to also be disclosed. The same also applies in the opposite direction, that is to say features which are structural, i.e. are according to the device, that are mentioned only with regard to the method can also be taken into consideration and claimed within the scope of the device claims and are likewise included in the disclosure.

BRIEF DESCRIPTION OF THE DRAWINGS

The disclosure is illustrated schematically in particular in a number of exemplary embodiments in the drawing, in which:

FIGS. 3a and 3b show, in a three-dimensional view (FIG. 3b) and in a vertical sectional view (FIG. 3a), the center section according to the locking unit according to the disclosure.

DETAILED DESCRIPTION

In the figures, identical or mutually corresponding elements are each denoted by the same reference signs and are therefore not described again, unless expedient. The disclosures contained in the entire description are expediently transferrable to identical parts with the same reference signs or the same component designations. The positional details selected in the description, e.g. top, bottom, laterally, etc. are also related to the directly described and illustrated figure and can expediently be transferred in the event of a change in position to the new position. Furthermore, individual features or combinations of features from the different exemplary embodiments shown and described can also be independent, inventive solutions or solutions according to the disclosure.

Figure 1A:
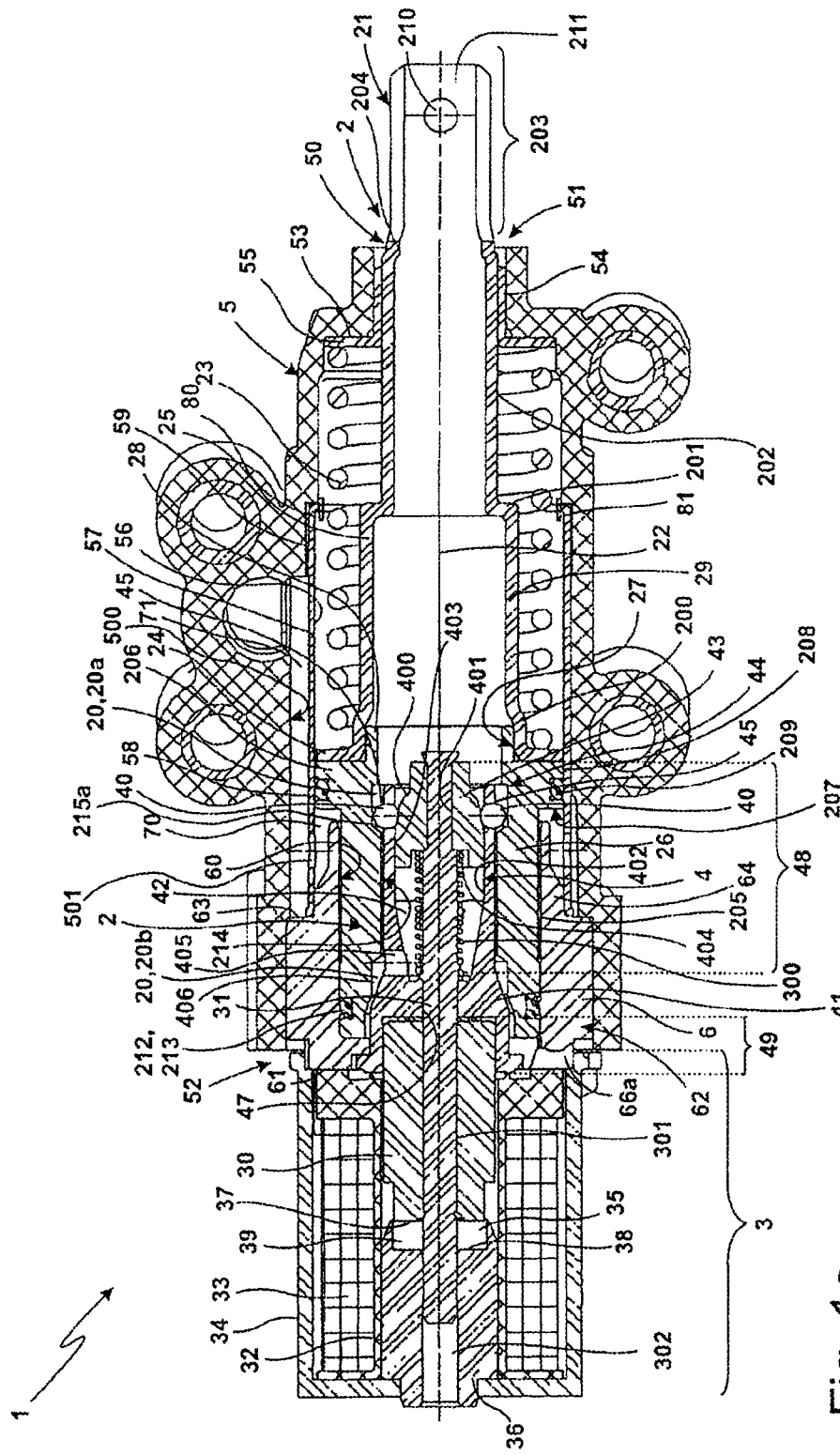
FIG. 1a shows, in a vertical section, a first exemplary embodiment of the locking unit according to the disclosure.

FIG. 1a schematically shows the locking unit 1 according to the disclosure in a first exemplary embodiment. The locking unit 1 has a housing 5, at the front housing end 50 of which an opening 51 is provided from which the front end 21 of the piston 2 protrudes.

At the housing end 52 opposite the opening 51, a solenoid 3 adjoins the housing 5 in the axial direction. Axial direction means here either the axis of symmetry or longitudinal axis 22 of the piston 2 or else the direction of movement of the piston 2.

In the housing 5, the piston 2 is mounted movably in the axial direction, in particular along its longitudinal axis 22. For the movement of the piston 2, a drive is provided here; in particular, the piston 2 can be acted upon with pressure, preferably with hydraulic pressure, wherein the force component of said pressure is directed counter to the direction of force of a piston spring 23. The piston spring 23 is supported here firstly on a housing step adjoining the housing end 50 on the inside or on a step 53 of the housing 5. Secondly, the piston spring 23 is supported on a flange ring 24 of the piston 2. Said flange ring 24 lies in the interior, centrally in the housing 5.

Owing to the pressure, the piston 2 moves between a plurality of positions; in the variant shown here, for example, two positions are provided. The position of the piston 2 in the respective positions can be secured by a latching unit 4 which is equipped with latching elements 40. For the actuation of the latching unit 4, in particular for the latching elements 40 thereof, use is made of the solenoid 3 or use is made of the elements thereof.

The solenoid 3 has a coil body 32 which bears a winding 33. The latter comprises a wire through which an electrical current can flow. The winding 33 is closed radially on the outside (with respect to the longitudinal axis 22) by a solenoid housing 34. Energizing the winding 33 gives rise to a magnetic field.

An armature space 35 is provided in the interior of the coil body 32, wherein the armature space 35 here fills approximately half of the interior space of the coil body 32. The armature space 35 is oriented here in the direction of the piston 2. The remaining region of the interior space of the coil body 32 is filled by a solenoid core 36 which, as customary, is composed of soft magnetic material which readily guides the magnetic field lines. Located in the armature space 35 is an armature 30 which, in the exemplary embodiment shown here, is designed in the manner of a cylinder and has a base surface 37. An air gap 39 is formed between the base surface 37 and an end surface 38 of the solenoid core 36, said end surface facing the armature space 35.

If the winding 33 is not energized, a solenoid spring 300 pushes the armature 30 to the right such that the air gap 39 is at its maximum extent. If the winding 33 is energized, it generates a magnetic field which pushes the armature 30 to the left counter to the force of the solenoid spring 300 such that the air gap 39 is closed.

The armature 30 bears an armature rod 31. The armature rod 31 is oriented here concentrically with respect to the armature 30, and armature 30 and armature rod 31 are mounted movably in the axial direction, i.e. parallel to the longitudinal axis 22, in the armature space 35. The design is selected here in such a manner that the armature 30 has an axial bore 301 which receives the armature rod 31. The armature rod 31 protrudes over the armature 30 on both sides thereof.

An axial bore 302 is likewise provided in the solenoid core 36. The arrangement is selected in such a manner that a mounting for the armature rod 31 is located in said axial bore 302.

The armature space 35 is limited on the one side by the solenoid core 36, wherein the solenoid core 36, as already described, fills that part of the interior space of the coil body 32 which faces away from the piston 2 and thus also describes the axial end of the solenoid 3, but also of the locking unit 1, together with the solenoid housing 34.

On the other side, facing the piston 2, the armature space 35 is limited by a yoke part 41 which is configured in the manner of a cup and is preferably formed from soft magnetic material in order to readily guide the magnetic field lines. Part of the armature 30 dips here into the yoke part 41 which is configured in the manner of a cup.

The yoke part 41 here is part of the latching unit 4. The yoke part 41 has a penetration bore 47 which receives and optionally also supports the armature rod 31.

The latching unit 4 is substantially H-shaped, as seen in section. The radially oriented web of the H forms the yoke part 41. This is adjoined by a first axial portion 48 and a second axial portion 49. The two axial portions 48, 49 of the H adjoining here on both sides of the web differ in size or differ in length, wherein the portion 49 facing the armature space 35 is significantly shorter axially than the portion 48 facing the piston 2. The larger portion 48 here or in typical embodiments is approx. 2 to 3, 3.5 or 4 times larger or longer than the smaller portion 49.

An equalizing opening 405 running radially (with respect to the longitudinal axis 22) is arranged in the foot region of the sleeve-like first axial portion 48, said foot region facing the yoke part 41. Said equalizing opening 405 fluidically connects an interior space 42 to an exterior space 406 in which a piston thrust piece 26 of the piston 2 moves axially. Pressure equalization between the interior space 42 and the exterior space 406 is possible through the equalizing opening 405.

The two portions 48, 49 radially close one corresponding receiving space each. In this case, the smaller second portion 49 delimits the armature space 35 (this is the cup-like yoke part 41) and the larger portion 48 delimits the interior space 42. The interior space 42 extends here in the axial direction. The interior space 42 is also provided with the solenoid spring 300 which is supported firstly on the upper side of the yoke part 41, said upper side facing the second portion 49, and secondly on a control element 43 which is arranged on the end side of the armature rod 31. The control element 43 is arranged here in a positionally fixed manner on the armature rod 31.

The control element 43 also has a receiving bore 401 into which the armature rod 31 is inserted. The control element 43 is compressed in a suitable manner with the armature rod 31 and thus held in a positionally precise manner on the latter. The control element 43 essentially consists of two different geometrical bodies, a cylinder portion and a cone portion, wherein the lateral surface of the cone portion forms a cone surface 400. A lateral surface 403 of the cylinder portion of the control element 43 is guided, optionally also mounted, on an interior space wall 402 radially bounding the interior space 42. Located at the axial end of the control element 43, the axial end facing the solenoid 3, is an annular recess 404 in which the end of the solenoid spring 300 is located and is thus reliably guided and held. The cone surface 400 is located at that end of the control element 43 which lies opposite the recess 404.

It is clear that other designs are also possible for the configuration of the control element 43. For example, it is thus also conceivable that the cone surface is arranged on the control element on the side facing the solenoid 3 and then the manner of functioning of the locking unit 1 is optionally changed. The variant shown in FIG. 1a is planned in such a manner that, when the solenoid is currentless, i.e. when the winding 33 is currentless, the control element forces the latching elements 40, which are designed here as balls, radially outward and thus blocks the piston 2. However, the movement of the piston 2 can also be blocked when the solenoid 3 is energized.

The position of the air gap 39 is also variable in this case according to the proposal. In the exemplary embodiment shown in FIG. 1a, the air gap 39 is located on that side of the armature 30 which faces away from the latching unit 4, i.e. between armature 30 and the solenoid core 36. As an alternative thereto, it is also possible for the air gap then to be formed between the armature 30 and the yoke part 41, i.e. that side of the armature 30 which faces the latching unit 4.

The arrangement of the solenoid spring 300 in the interior space 42 is advantageous since said elements therefore do not impair the magnetic circuit which is formed in the elements around the armature space 35.

Alternatively, an arrangement of the solenoid spring in the armature space or else outside the latching unit 4 is also possible in order to form a corresponding force accumulator.

When the winding 33 is energized, the air gap 39 is closed by the armature 30 being offset to the left, as a result of which the armature rod 31 and the control element 43 carried by the armature rod 31 are also offset to the left, and therefore the solenoid spring 300 is compressed and thus forms a force accumulator for a resetting movement of the unit of armature 30, armature rod 31 and control element 43 when the energizing of the winding 33 is switched off.

The larger first portion 48 of the latching unit 4 bears, at its end or end region 44 facing away from the yoke part 41, the latching element or the latching elements 40 which are designed here as balls. The larger portion 48 (at least in the end region 44) is formed here in the manner of a sleeve or cylinder. The latching elements 40 are provided as balls 40 in a ball cage. The sleeve- or cylinder-like end region 44 of the portion 48 has bores 45 oriented here radially (with respect to the longitudinal axis 22) for receiving the latching elements 40 or balls.

Depending on the axial position of the control element 43, it is possible for the latching elements 40 or balls 40 to be able to yield radially inwards or not.

In the exemplary embodiment shown in FIG. 1*a*, the piston 2 consists of two individual parts. The piston 2 comprises a piston tube 25 which partially protrudes out of the opening 51, and a piston thrust piece 26 produced separately from said piston tube. The arrangement is selected here in such a manner that the piston thrust piece 26 adjoins the inner end of the piston tube 25 in the housing 5.

The piston tube 25 is completely hollow on the inside. It is preferably formed as a deep drawn part, for example from metal, such as, for example, tool steel or similar, and therefore the production of such an element is made considerably less expensive. The wall thickness of the piston tube 25 is therefore here also only approx. 5 to approx. 15 percent of the diameter of the piston tube 25 or of the outside diameter of individual parts (e.g. inner end 27, first tube center section 29, second tube center section 202 and connecting region 203) of the piston tube 25.

The piston tube 25 lies with its flange ring 24 provided on the end side against the piston thrust piece 26. The flange ring 24 therefore forms a boundary surface of the piston tube 25, said boundary surface being oriented radially (with respect to the longitudinal axis 22). Said inner end 27 which also includes the flange ring 24 is plugged onto the connecting ring 28 which closes off the piston thrust piece 26 in the direction of the piston tube 25. A relatively precise fit can be provided here and, for example, the piston tube 25 can thereby be pressed onto the piston thrust piece 26. Of course, other connecting methods, such as, for example, welding, soldering or else adhesive bonding of the elements—piston tube 25 and piston thrust piece 26—are alternatively also possible.

The end 27 then merges in a tapering 200 into a first tube center section 29, i.e. the diameter of the piston tube 25 in the region of the first tube center piece 29 is smaller than in the region of the end 27. The first tube center piece 29 then adjoins the second tube center section 202 at a further, second tapering 201 which is designed as a step. The diameter of the piston tube 25 in the region of the second tube center section 202 is smaller than in the region of the first tube center section 29. Said second tapering 201 forms a stop.

The piston 2 is guided in a plain bearing 54. The latter has an inner flange 55. If the piston 2 is displaced to the right, the movement is thereby limited by the fact that the shoulder-like tapering 201 lies on the radially acting inner flange 55 of the plain bearing 54. Such a state is illustrated, for example, in FIG. 2*b*.

The plain bearing 54 which has just been mentioned for the piston tube 25 is provided on the inner side of the opening 51 of the housing 5. The second tube center section 202 is mounted on said plain bearing 54. The plain bearing 54 has an inner flange 55 which is oriented into the housing interior and also forms the step 53 in this region. Since the housing 5 is preferably composed of plastic, this part is correspondingly oversprayed. However, it is also possible for the plain bearing 54 to be inserted into a separately produced, for example sprayed, housing 5, such as, for example, a plastics housing. Relatively high accuracy is preferably favorable here, per certain embodiments, i.e. in the region of the opening 51 and of the embedding of the plain bearing 54 in the housing 5.

In the position shown here of the locking unit 1, the piston 2 is pushed completely into the housing 5 and only the end-side connecting region 203 of the piston 2 protrudes out of the housing 5. Further elements, not shown here, which are moved or held by the piston 2 are connected to the piston 2 in the connecting region 203. The second tube center section 202 merges here in the third tapering 204 into the connecting region 203.

As already explained, all of the axial portions, i.e. the inner end 27, the first tapering 200, the first tube center section 29, the second tapering 201, the second tube center section 202, the third tapering 204 and the connecting region 203 are hollow on the inside.

It should be noted that the connecting region 203 has a recess provided on the center plane, i.e. is slotted. A fork-like structure of the connecting region 203 is formed, wherein remaining half shells 211 of the connecting region 203 nevertheless provide sufficient stability for the connection to a further element, not illustrated specifically. In order to receive a fastening bolt or similar, a respective bore or other penetration opening 210 is provided in the half shell 211.

The piston thrust piece 26 is likewise formed substantially in the manner of a sleeve, i.e. hollow on the inside. Its outer surface 205 is used for guidance. At the front end facing the piston tube 25, an outer ring 206 is provided on the piston thrust piece 26. The outer surface of said outer ring is mounted, but at least guided, on a housing inner wall 56. The outer ring 206 lies in the axial direction (with respect to the longitudinal axis 22) against the flange ring 24 of the piston tube 25. A pressure side 207 of the outer ring 206, which pressure side faces away from the flange ring 24, is acted upon with pressure, preferably with hydraulic pressure, and is therefore also of correspondingly solid design. An annular pressure space 70 is provided here.

The piston thrust piece 26 is therefore preferably, according to an embodiment, realized as a turned part. It is preferably composed of tool steel per an embodiment. An encircling step 208 which receives an O ring seal or a sealing ring 209 is provided radially on the outside of the pressure side 207. Since said O ring seal or the sealing ring 209 is exposed to the hydraulic pressure, it is also pressed in the radial direction and thus reliably closes a gap which perhaps still remains between the radial outer surface of the outer ring 206 and the housing inner wall 56.

Furthermore, a center section 6 is provided. The center section 6 is likewise designed in the manner of a sleeve and its inner side forms a bearing surface 60 for the piston thrust piece 26. The bearing surface 60 interacts here with the lateral surface or outer surface 205 of the piston thrust piece 26. The center section 6 is positionally fixed in the locking unit 1. For example, the center section 6 is provided as a turned part and is preferably composed of a customary tool steel. In a further embodiment, it is provided that the center section 6 is designed as a sintered shaped part or is manufactured in a formative method, in particular by means of 3D printing, metal powder injection molding, selective laser melting or selective laser sintering. Sintering or formative manufacturing are cost-effective production methods with which in addition workpieces shaped virtually as desired can be produced in a single working cycle.

The center section 6 has an axial length (with respect to the longitudinal axis 26) depending on other components of the proposed locking unit 1.

The axial length of the center section 6 corresponds here to approx. 100-200%, preferably approx. 130-170%, of the stroke of the piston 2.

The axial length of the center section 6 corresponds here to approx. 20-50%, preferably approx. 30-40%, of the axial length of the piston 2.

The axial length of the center section 6 corresponds here to approx. 10-30%, preferably approx. 13-20%, of the axial length of the locking unit 1.

The outer surface 205 here is the lateral surface of a cylinder. The outer surface 205 bears a further O ring seal 213 in a circumferential groove 212 at its end facing away from the piston tube 25 and facing the solenoid 3. Said O ring seal 213 seals the gap which remains between the outer surface 205 and the bearing surface 60 and is pressurized, in the direction of the solenoid 3.

The piston 2 shown in FIG. 1a consists of the two components, the piston tube 25 and the piston thrust piece 26, which are fixedly connected mechanically to each other in the variant shown here because, for example, they are plugged on or compressed. However, they can alternatively also be formed in a floating manner with respect to each other, i.e. can be pressed against each other only because of the dynamic effect of the applied pressure, on the one hand, and the counter-directed force of the piston spring 23, on the other hand.

Said piston 2 which consists of two components is first of all mounted on the bearing surface 60 of the center section 6 by means of the piston thrust piece 26. A further mounting is alternatively provided on the outer ring 206 of the piston thrust piece 26 in cooperation with the housing inner wall 56. Ultimately, the second tube center section 202 of the piston tube 25 is mounted on the plain bearing 54 provided on one side.

An inner surface 214 of the piston thrust piece 26 is also not smooth, but rather has indentations or latching receptacles 20, 20a, 20b on the end side in each case, i.e. spaced apart axially from one another (with respect to the longitudinal axis 22). The diameter of the ring-like indentations or latching receptacles 20, 20a, 20b is larger here than the diameter of the inner surface 214 lying between them.

The latching receptacles 20, 20a, 20b are turned into the inner surface 214 of the sleeve-like piston thrust piece 26 in the form of a step or inner shoulder. The latching unit 4 is arranged in the housing 5 in a positionally fixed manner, and the piston 2 is designed to be axially or longitudinally movable in relation to the latching unit 4. However, in the position shown in FIG. 1a, the movement of the piston 2 to the right, in the direction of the opening 51, is blocked by the latching unit 4; the locking unit 1 is blocked in the retracted position of the piston 2.

As already mentioned, the latching unit 4 has latching elements 40, here, for example, balls 40 of a ball cage, which are mounted in respective bores 45 so as to be movable radially (with respect to the longitudinal axis 22). The solenoid 3 is shown in a dropped position, i.e. the winding 33 is not acted upon with current. The air gap 39 is therefore formed between the armature 30 and the solenoid core 36 since the solenoid spring 300 offsets the armature 30 to the right and therefore also the control element 43 on which the solenoid spring 300 is indeed supported. The control element 43 therefore passes onto the axial position of the latching elements/balls 40, and therefore the cone surface 400 of the control element 43 acts on the latching elements/balls 40 and pushes the latter radially outwards (with respect to the longitudinal axis 22) into the respective latching receptacles 20, 20a. Then, however, a longitudinal movement of the piston 2, i.e. a movement of the piston 2 to the right, is blocked since a first inner shoulder 215a which bounds the latching receptacle 20, 20a lies against the latching elements 40 which are offset radially outward. The first inner shoulder 215a is located here on the first latching receptacle 20a, on the side facing the second latching receptacle 20b.

In the position shown in FIG. 1a, that end of the piston thrust piece 26 which faces away from the piston tube 25 furthermore lies against a radially running stop surface 61 of the center section 6 and thus also blocks a movement of the piston 2 to the left, in the direction of the solenoid 3.

Figure 2A:
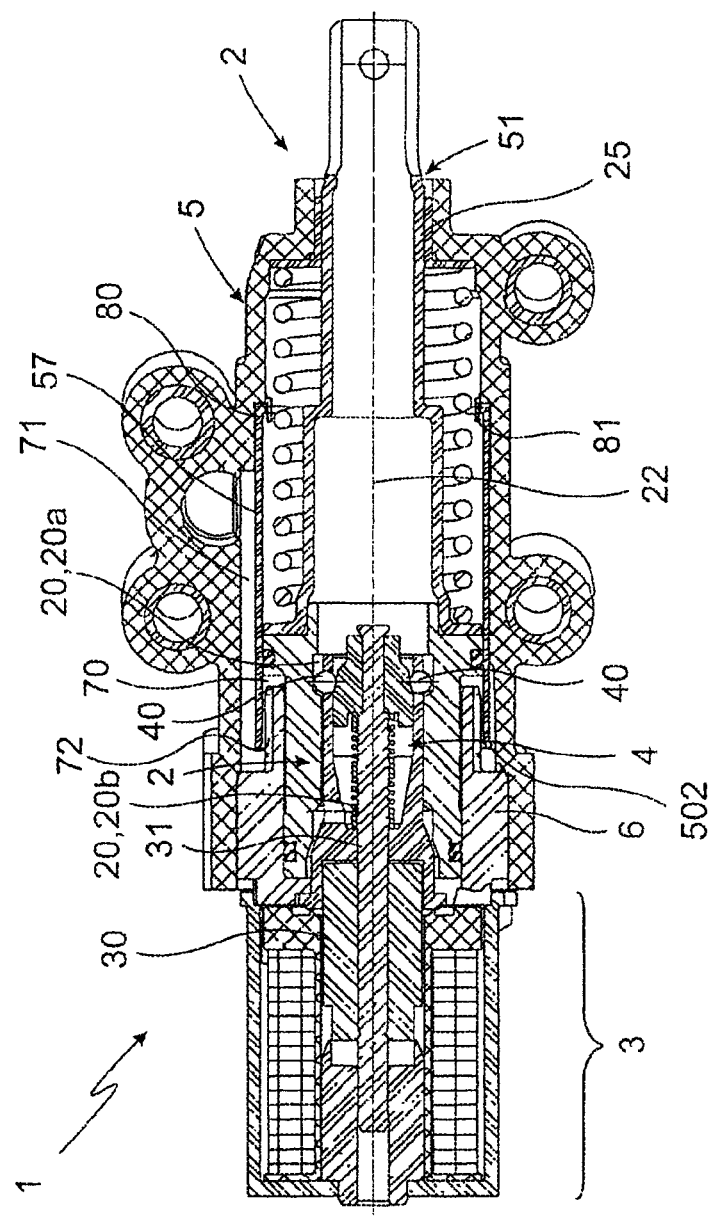
Figure 2B:
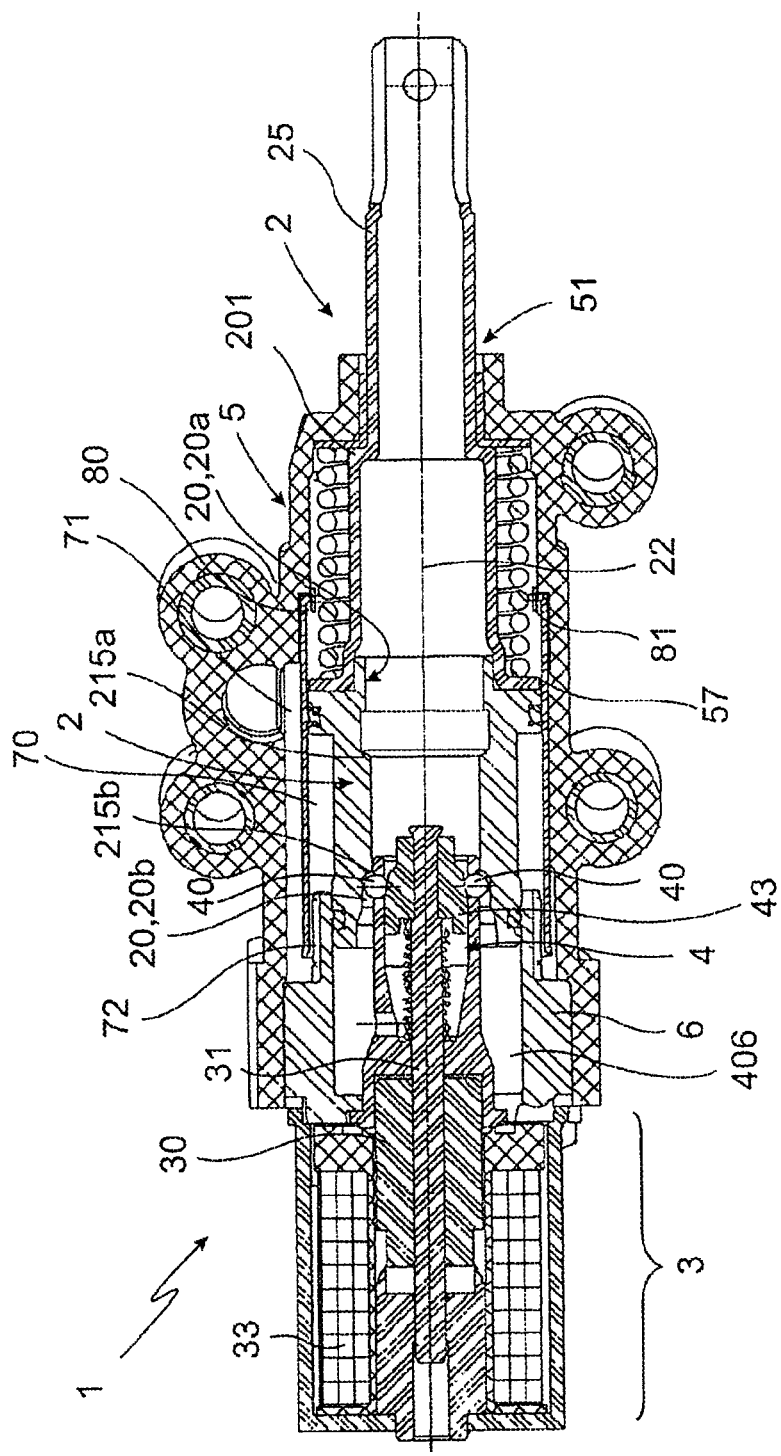

For the sake of completeness, reference should also be made at this juncture to FIG. 2b which shows the position in which the piston 2 is extended to the right completely out of the housing 5. This end position is firstly limited by the second tapering 201 lying against the inner flange 55 of the plain bearing 54 in the region of the opening 51 of the housing 5. In this position, the solenoid 3 is in turn switched off, i.e. the winding 33 is not acted upon with current, and therefore the control element 43 pushes the latching elements/balls 40 into the outer or second latching receptacle 20, 20b of the piston thrust piece 26 and thus on the other hand blocks a movement to the left. The radially pushed-out latching elements/balls 40 then lie against a second inner shoulder 215b which bounds the second latching receptacle 20b. The second inner shoulder 215b is located here on that side of the second latching receptacle 20b which faces the first latching receptacle 20a. As already described, the two latching receptacles 20a and 20b are spaced apart from each other axially (with respect to the longitudinal axis 22).

The piston 2, in particular the piston thrust piece 26, is mounted movably between the latching unit 4 arranged radially on the inside and the center section 6 arranged radially on the outside. In the embodiment shown, the center section 6 takes up a central position in the locking unit 1. On the one hand, the radial outer side 62 of said center section bears the sleeve-like housing 5. However, on the other hand, it also produces a connection to the solenoid 3, in particular to the solenoid housing 34 thereof.

Figure 1B:
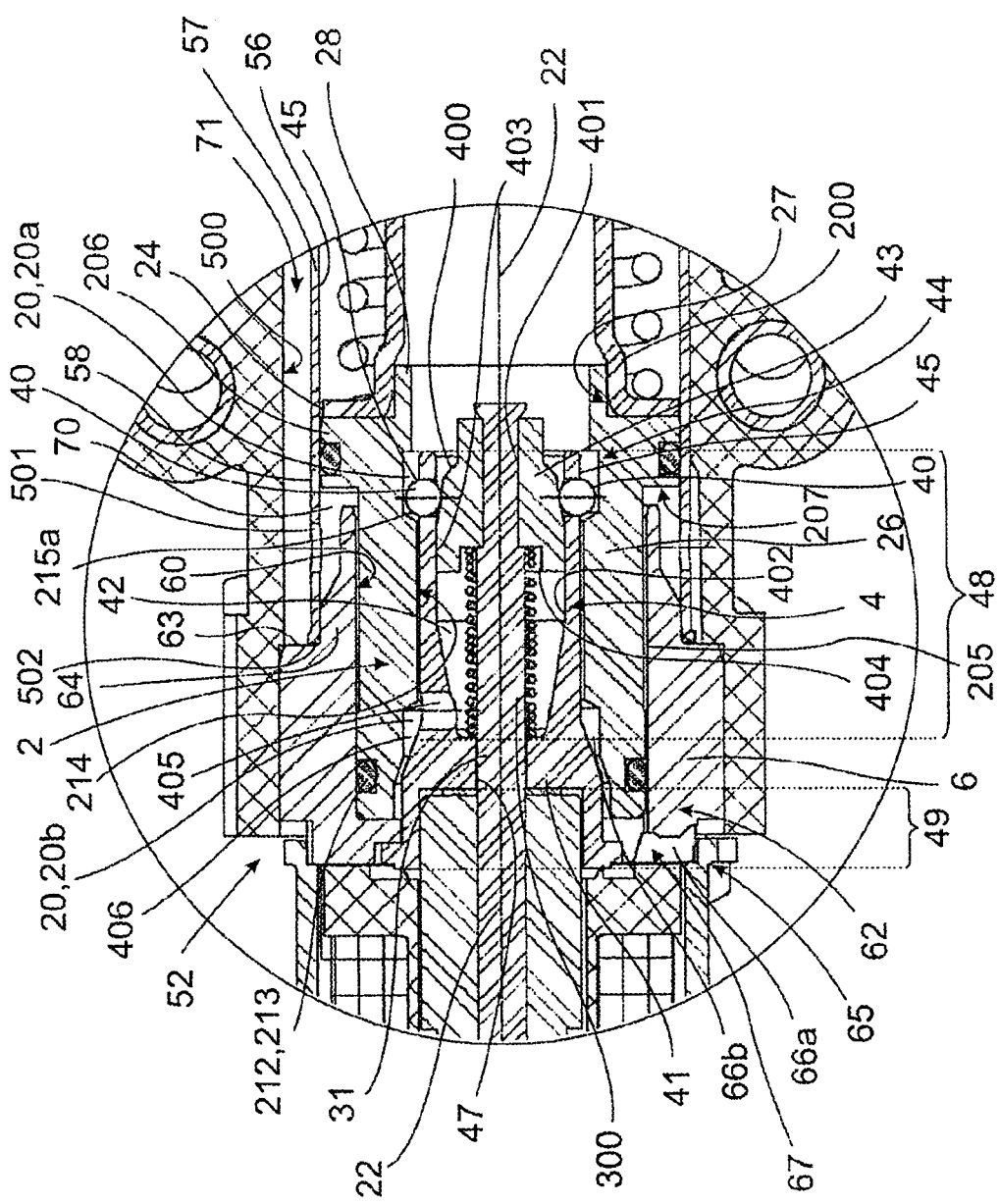
FIG. 1b shows an enlarged detail in the region of the center section according to FIG. 1a, FIGS. 2a and 2b each show, in a vertical section, a second exemplary embodiment of the locking unit according to the disclosure in two different positions of the piston.

In the lower region in FIG. 1b, a radially running gap 65 can be seen between the solenoid housing 34 and the housing 5, said gap extending radially on the inside into a channel 66a which is in fluidic contact with an interspace 66b which arises between the thrust piece 26 and the latching unit 4. The radially running channel 66a is realized here in such a manner that a recess 67 (see FIGS. 3a and 3b) is provided on a foot region 68 (see FIGS. 3a and 3b) of the center section 6, the foot region facing the solenoid 3, and therefore the foot region 68 of the center section 6, said foot region facing the solenoid 3, does not lie over the entire extent against the flange part of the coil body 32. The fluidically interconnecting elements of interspace 66b, channel 66a and gap 65 permit venting of the interior of the locking unit 1.

Furthermore, the center section 6 orients the solenoid 3 radially with respect to the latching unit 4. It is favorable to realize a high degree of concentricity in this region.

The center section 6, on its side facing away from the solenoid 3 or facing the piston tube 25, has an encircling contact shoulder 63 which is then adjoined by an annular and/or conical connecting region 64.

Said connecting region 64 is a constituent part of the center section 6. The proposal according to an embodiment of the disclosure is highly variable for the configuration of the connecting region 64. The connecting region 64 here has a plurality of tasks.

First of all, said connecting region supports a tube section 57 which may also be referred to as a sleeve section, which is part of the housing 5 and the inner side of which provides the housing inner wall 56. Furthermore, at least part of the connecting region 64 limits the pressure space 70, i.e. is in contact with the pressurizable medium. For this purpose, the tube section 57 is pushed or pressed onto the preferably annular region of the connecting region 64. As already described, the piston 2, in particular the piston thrust piece 26, lies against the housing inner wall 56; in this respect, the tube section 57 has the properties of a cylinder. The tube section 57 preferably limits or conducts the pressure not only on its housing inner wall 56, but also on its tube outer side 58.

The mounting of the first end piece of the tube section 57 on the center section 6 underlines the suitability of the center section 6 in the embodiment shown here. The second end piece of the tube section 57 is mounted in the housing 5, and the inner side of the tube section 57 serves as a mounting or guide of the piston 2.

Figure 4A:
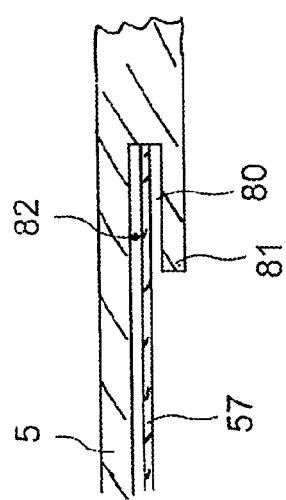
FIGS. 4a to 4c show possible embodiments of a fluid-tight connection between housing and tube section.
Figure 4B:
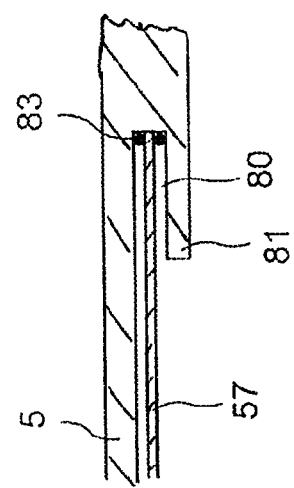
Figure 4C:
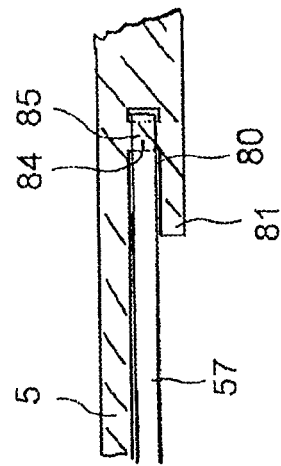

In the present embodiment, the tube section 57 is connected in a fluid-tight manner to the housing 5 on the right side. This is brought about by the fact that the tube section 57 is pushed into a groove 80 of the housing 5. The groove 80 is of annular design here and is limited radially on the inner side by a projection 81 of the housing 5. It is ensured by means of the connection of fluid-tight design that fluid which is under pressure and which is located in the pressure conducting channel 71 does not pass at the connecting point between housing 5 and tube section 57 into a region radially on the outer side of the piston tube 25, which would counteract a movement of the piston 2 to the right, which is intended to be achieved specifically by means of the fluid under pressure, as described below. Possible embodiments of a tight connection are illustrated in FIGS. 4a to 4c and will be described further below.

A pressure connection, not illustrated specifically in FIG. 1a, which provides a pressurized medium as the drive for the piston 2 is located on the housing 5. Said pressure connection is preferably arranged, per an embodiment, in that half of the housing 5 which faces the opening 51; in particular, it is situated close, in particular very close, to the opening 51. In order now to realize as large a stroke of the piston 2 as possible, the pressure side 207, which can be acted upon with pressure, of the piston thrust piece 26 has to be removed as far as possible from the opening 51 in the retracted position of the piston 2. This boundary condition leads to the pressurized medium first of all having to be conducted in the housing 5 or in the locking unit 1 counter to the preferred direction of movement (the working movement realized by the pressurization, to the right in FIG. 1a) of the piston 2 in order then to be deflected at a suitable point and guided onto the pressure side 207.

The pressure connection, not shown, is therefore fluidically connected to the pressure conducting channel 71 running substantially axially (with respect to the longitudinal axis 22). Said pressure conducting channel 71 is limited radially on the inside by the outer side 58 of the tube section 57 and radially on the outside by the plastics housing 5, in particular the inner wall 500 thereof. The pressure conducting channel 71 can surround the entire tube section 57 (with respect to its circumferential direction) or can extend axially only in one segment, as shown in FIG. 1a.

Since the tube section 57 according to one embodiment is plugged fixedly, and therefore also tightly or in a pressure-tight manner on the connecting region 64 of the center section 6, an aperture 501 is provided at the axial height, with respect to the longitudinal axis 22, of the connecting region 64 in the tube section 57, through which aperture the pressurized medium passes out of the pressure conducting channel 71 into the pressure space 70 on the inner side of the tube section 57.

The tube section 57 therefore has a plurality of tasks.

Its housing inner wall 56 serves as a guide or mounting of the piston 2. Its outer side 58 serves at least partially as the pressure conducting channel 71.

Furthermore, the tube section 57 supports or reinforces the housing 5 which is preferably composed of plastic per an embodiment. This combined construction of the housing 5 combines a low mass and favorable production with a high degree of wear resistance and therefore with high availability of a locking unit configured in such a manner.

The end 59 of the tube section 57 that faces away from the connecting region 64 is surrounded annularly by the plastics material of the housing 5. The pressure conducting channel 71 therefore does not inevitably extend over the entire axial length of the tube section 57. For example, the tube section 57 can be insert molded by the plastic of the housing 5; alternatively, for example, the tube section 57 can be plugged or pressed into a housing 5 produced in a separate manufacturing step.

FIGS. 3a, 3b show an exemplary embodiment of the center section 6. A center section 6 configured in such a manner is also found in the use example according to FIG. 2a or 2b.

The center section 6 is formed in the manner of a sleeve. In the installed state, it has a foot region 68 which faces the solenoid 3 and is adjoined by a center portion 69. On the side facing away from the foot region 68, the center section 6 is closed by a connecting region 64. The center portion 69 has the largest diameter and, in the installed state, lies directly against the plastics material of the housing 5.

The diameter of the foot region 68 is smaller than the diameter of the center portion 69. The foot region 68 is not completely configured as an encircling ring, but rather has, in a certain angular segment, a recess 67 which, in the installed state, forms the channel 66a. The center portion 69 merges with the radially running contact shoulder 63 into the connecting region 64.

The outside diameter of the connecting region 64 is also smaller than the diameter of the center portion 69. The tube section 57 is plugged onto the connecting region 64 in the installed state. For this purpose, the connecting region 64 is provided with a multiplicity of supporting segments 600 which are designed as lateral segments on the cylinder-like outer surface of the connecting region 64 and are each separated by segment interspaces 72. Said segment interspaces 72 are formed as clearances in the lateral surface of the connecting region 64 and guide the medium; that is to say, in the installed state and during operation, the corresponding operating pressure prevails in the segment interspaces 72. The segment interspaces 72 are therefore part of the media-guiding system.

The exemplary embodiment of the center section 6 according to FIG. 1a or 1b differs with respect thereto as follows:

As already explained, there is a fluidic connection between the pressure conducting channel 71, which is arranged on the radial outer side of the tube section 57, and the pressure space 70, which is arranged on the radial inner side of the tube section 57. In the example shown in FIGS. 1a and 1b, said connection is realized by the aperture 501 in the tube section 57. That end 502 of the tube section 57 which faces the center section 6 is pushed here completely onto the connecting region 64 and lies fully (and therefore also in a sealing manner) against the radially outwardly running contact shoulder 63.

FIGS. 2a and 2b show the use of the center section 6 according to FIGS. 3a and 3b. It can readily be seen that the end 502 facing the center section 6 is spaced apart axially (with respect to the longitudinal axis 22) from the contact shoulder 63. The segment interspaces 72 extending in the axial direction (with respect to the longitudinal axis 22) are therefore fluidically connected to the pressure conducting channel 71 and also to the pressure space 70. The axial distance (with respect to the longitudinal axis 22) of the tube end 502 from the contact shoulder 63 corresponds here to the aperture 501 and here forms a radial connection from the inner side of the tube section 57 to the outer side of the tube section 57. This connection runs here outside the tube section 57, i.e. offset axially outward, with respect to the tube section end 502.

FIGS. 2a and 2b each show, in a vertical section, a second exemplary embodiment of the locking unit 1 according to the disclosure in two different positions of the piston.

In FIG. 2a, the piston 2 is completely retracted in the locking unit 1 and is secured in said end position by the latching unit 4. The completely retracted position of the piston 2 results from the fact that the piston thrust piece 26 is exposed only to a small pressure, if any pressure, which generates a force which is smaller than the opposite spring force of the piston spring 23. In FIG. 2b, the piston 2 is completely pushed out of the locking unit 1 and is likewise secured in said end position by the latching unit 4.

As already explained, the blocking position of the latching unit 4 is realized in the dropped, i.e. non-energized, state of the solenoid 3, but without the disclosure being set thereto; the blocking position can alternatively also be realized in the energized state of the solenoid.

In order, for example, now to move the piston 2 from the position shown in FIG. 2a into the position shown in FIG. 2b, the procedure can be as follows, according to an embodiment.

First of all, the blockage of the latching unit 4 should be eliminated. This takes place by the solenoid 3 being energized and, as a result, the unit of armature 30, armature rod 31 and control element 43 being offset axially and thus permitting radial movability of the latching elements/balls 40 which can then, for example, yield back radially inward and thus permit the axial movement (all with respect to the longitudinal axis 22) of the piston 2, here in particular of the piston thrust piece 26.

In the next step, a drive of the piston 2, here, for example, a hydraulic pressurization, is activated and the operating pressure prevailing on the piston thrust piece 26 then pushes the piston 2, consisting of the piston tube 25 and the piston thrust piece 26, to the right counter to the force of the piston spring 23, away from the solenoid 3. The piston tube 25 is thereby pushed out of the opening 51.

The end position thus achieved of the piston 2 is then secured again by the latching unit 4; for this purpose, the current through the winding 33 of the solenoid 3 is switched off or is at least so greatly reduced that the resulting magnetic force on the armature 30 is lower than the spring force of the magnetic fields 300 acting counter to the magnetic force. The dropping armature 30 shifts the control element 43 axially in such a manner that the cone surface 400 thereof pushes the latching elements/balls 40 radially outward into the latching receptacle 20 and thus prevents the piston 2 from yielding back, for example when pressure on the piston thrust piece 26 is switched off.

FIGS. 4a to 4c each show a detail of the connecting point between tube section 57 and housing 5, wherein different possibilities of the fastening and sealing are described.

As already mentioned further above, the tube section 57 is accommodated in a groove 80 which is formed annularly and is bounded radially on the inner side by a projection 81.

In the embodiment of FIG. 4a, a seal 82 in the form of a sealing ring is arranged between housing 5 and tube section 57. Said seal ensures a fluid-tight design.

In the embodiment of FIG. 4b, a seal 83 in the form of sealing material made of silicone, the sealing material ensuring the fluid-tight design, is arranged laterally of the tube section 57. The tube section 57 can therefore also be held in the groove 80.

In the embodiment of FIG. 4c, a number of bores 84 are formed in the tube section, through which bores a respective engagement part 85 of the housing 5 passes. This can take place, for example, by the fact that the housing 5 is sprayed around the tube section 57 during manufacturing. The engagement part 85 can therefore be connected in particular in a material bonded manner to the rest of the housing 5 and can therefore ensure a suitable fastening of the tube section 57.

Alternatively, it is also clear that the end of the tube section 57 can be insert molded even without the arrangement of bores 84. For example, at least at the end of the tube section 57, the plastics material of the housing 5 can lie here against said tube section on the inside (by means of the projection 81) and on the outside.

Figure 5:
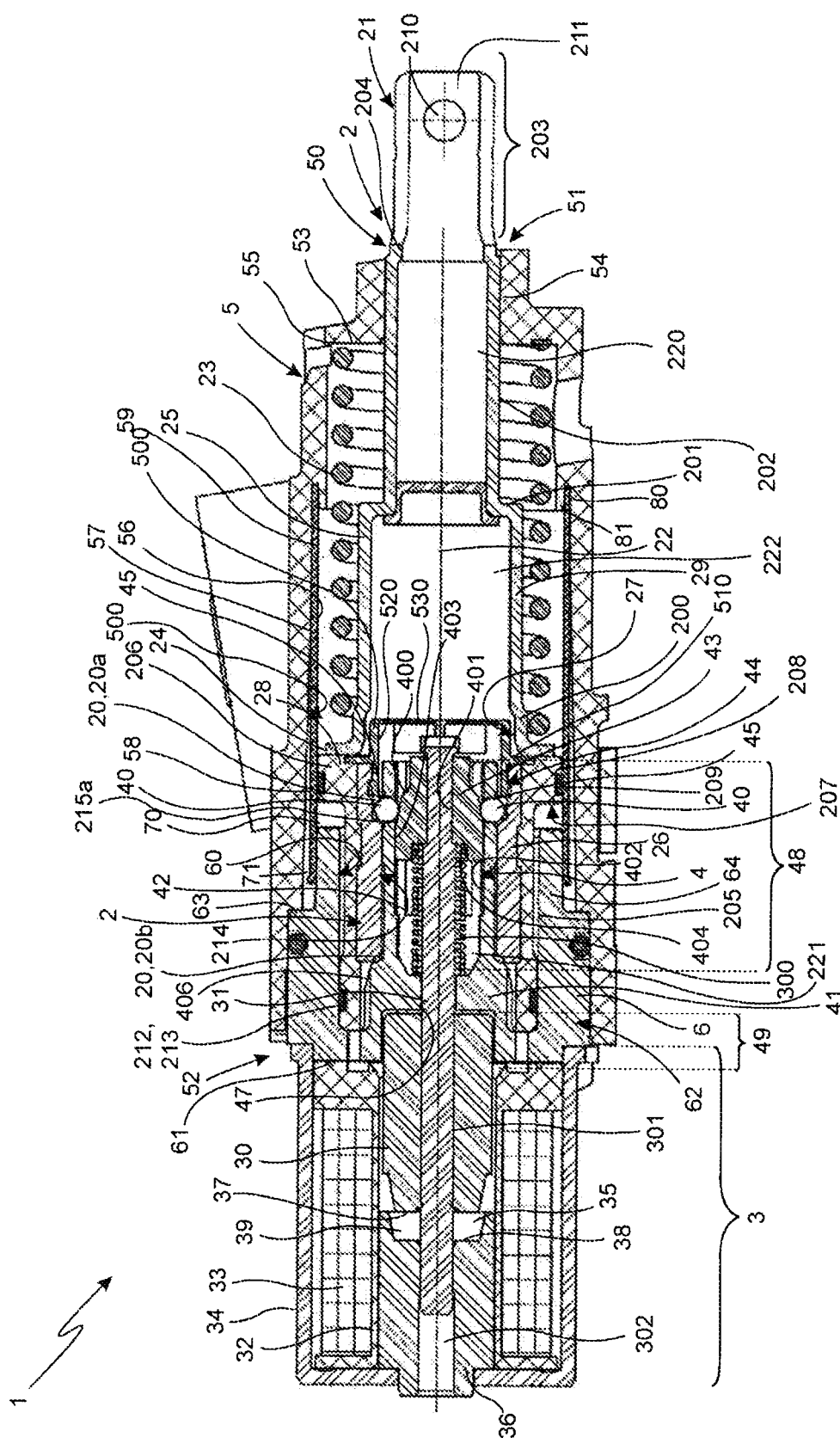
FIG. 5 shows, in a vertical section, a third exemplary embodiment of the locking unit according to the disclosure.

FIG. 5 shows a locking unit 1 according to a third exemplary embodiment. Essentially the differences over the exemplary embodiments already described will be discussed below. Otherwise, reference should be made to the description which has already been provided.

As already explained in the previously described exemplary embodiments, the piston 2 is hollow, and therefore a cavity 220 is formed in the piston 2. Said cavity is divided into a first cavity region 221 and a second cavity region 222. The first cavity region 221 is arranged in the piston thrust piece 26. The second cavity region 222 is arranged in the piston tube 25.

A filter unit 500 is arranged between the first cavity region 221 and the second cavity region 222. Said filter unit has an outer annular edge 510 with which it is fastened, as shown, in the piston 2, specifically between piston tube 25 and piston thrust piece 26. Arranged internally with respect to the annular portion 510 is a cup-shaped region 520, on the end side of which a filter 530 is arranged.

The annular edge 510 and the cup-shaped region 520 ensure in particular that the first cavity region 221 and the second cavity region 222 are sealed fluidically in relation to each other within the piston 2 apart from the filter 530. This prevents fluid from flowing elsewhere than through the filter 530 between the two cavity regions 221, 222 and thus transporting dirt particles without filtering.

The filter 530 ensures that an exchange of fluid between the two cavity regions 221, 222 is possible, but an exchange of dirt particles is prevented. For this purpose, the filter has a multiplicity of pores, the respective size of which is selected in such a manner that fluidic exchange is possible, but dirt particles which are typically to be expected are kept away. In particular, dirt particles which possibly penetrate into the piston 2 from the right side of FIG. 5, i.e., for example, originate from connected or actuated components, can thereby be kept away from the elements bringing about the latching.

It should be pointed out that, in the embodiment of FIG. 5, the center section 6 and the latching unit 4 are formed integrally. This feature leads to particularly simple production and high stability, but is functionally independent of the use of a filter, as just described.

Possible features of the proposal are reproduced in structured form below. The features reproduced in structured form below can be combined with one another as desired and can be incorporated in any combination into the claims of the application. It is clear to a person skilled in the art that the disclosure already arises from the subject matter having the fewest features. In particular, advantageous or possible refinements, but not the only possible refinements of the disclosure, are reproduced below.

The disclosure comprises:

A locking unit, in particular for the parking lock of an automatic transmission, for locking the movement of a piston (2) which is movable by a drive, and in particular can be acted upon with pressure or hydraulic pressure, the locking unit (1) having a solenoid (3) and at least one latching element (40), and the latching element (40) interacting with the armature (30) or the armature rod (31) of the solenoid (3), and the piston (2) having at least one latching receptacle (20, 20a, 20b), and the piston (2) being securable by the retaining interaction of the latching element (40) with the latching receptacle (20, 20a, 20b), wherein the piston (2) is at least partially mounted in a center section (6) which is at least partially surrounded by a housing (5), wherein the locking unit (1) has a latching unit (4) which supports the latching elements (40), wherein the latching unit (4) and the center section (6) are formed integrally.

The abovementioned locking unit, wherein the center section (6) is designed in the manner of a sleeve.

The abovementioned locking unit, wherein an inner side of the center section (6) forms a bearing surface for the piston (2) or for a piston thrust piece (26) of the piston (2).

The abovementioned locking unit, wherein the center section (6) is in the form of a turned part or sintered shape part, is produced in a formative method or is produced by means of 3D printing, metal powder injection molding, selective laser melting or selective laser sintering.

The abovementioned locking unit, wherein the center section (6) has an axial length of 100% to 200% or of 130% to 170% of a stroke of the piston (2).

The abovementioned locking unit, wherein the center section (6) has an axial length of 30% to 40% of an axial length of the piston (2).

The abovementioned locking unit, wherein the center section (6) has an axial length of 13% to 20% of an axial length of the locking unit (1).

The abovementioned locking unit, wherein the piston (2) is hollow on the inside completely along its axial extent.

The abovementioned locking unit, wherein the piston (2) has a cavity which extends axially through the entire piston (2).

The abovementioned locking unit, wherein the cavity is open at both axial ends.

The abovementioned locking unit, wherein the cavity continuously or in sections has a wall which is thinner than a quarter of a diameter of the piston (2) or is thinner than a tenth of the diameter of the piston (2).

The abovementioned locking unit, wherein the piston (2) has a completely hollow piston tube (25) along an axial portion and a piston thrust piece (26), which is connected to the piston tube (25), along a further axial portion.

The abovementioned locking unit, wherein the latching receptacles (20, 20a, 20b) are formed in the piston thrust piece (26).

The abovementioned locking unit, wherein the piston tube (25) is in the form of a deep drawn part, from tool steel or from metal.

The abovementioned locking unit, wherein the piston tube (25) has a wall thickness of 5% to 15% of the diameter of the piston tube (25).

The abovementioned locking unit, wherein the piston (2) is at least partially mounted in the housing (5).

The abovementioned locking unit, wherein the housing (5) is entirely or partially formed from plastic.

The abovementioned locking unit, wherein the piston tube (25) has a tube center section (29) with an outer tapering (201), wherein the tapering (201) of the piston tube (25) interacts with a step (53) formed in the housing (5), in order to limit a movement of the piston (2) away from the solenoid (3).

The abovementioned locking unit, wherein a piston spring (23) is provided between housing (5) and piston (2) and pushes the piston (2) in the direction of the solenoid (3).

The abovementioned locking unit, wherein the piston (2) is mounted opposite the solenoid (3) in a plain bearing (54) of the housing (5).

The abovementioned locking unit, wherein the housing (5) has an internal tube section (57), wherein a pressure conducting channel (71) is formed on the outer side of the tube section (57).

The abovementioned locking unit, wherein the pressure conducting channel (71) is connectable hydraulically from the outside via a connection through the housing (5).

The abovementioned locking unit, wherein the center section (6) has a radial outer side (62) which supports the housing (5).

The abovementioned locking unit, wherein the center section (6) is connected to a solenoid housing (34) of the solenoid (3).

The abovementioned locking unit, wherein the center section (6) has an encircling contact shoulder (63) on its side facing away from the solenoid (3) and/or facing the piston tube (25), which contact shoulder is adjoined by an annular and/or conical connecting region (64).

The abovementioned locking unit, wherein the connecting region (64) supports the tube section (57).

The abovementioned locking unit, wherein a number of segment interspaces (72) are designed as notches radially on the outer side in the connecting region (64).

The abovementioned locking unit, wherein the segment interspaces (72) are designed as a fluidic connection between pressure conducting channel (71) and a pressure space (70) within the tube section (57).

The abovementioned locking unit, wherein respective supporting segments (600) which support the tube section (57) are formed between the segment interspaces (72).

The abovementioned locking unit, wherein the connecting region (64) is designed as a crown ring.

The abovementioned locking unit, wherein the latching unit (4) has a portion (49) facing the solenoid (3) or an armature space (35) of the solenoid (3) and a portion (48) facing the piston (2), which portions are each of sleeve-shaped design.

The abovementioned locking unit, wherein that portion (49) of the latching unit (4) which faces the solenoid (3) partially accommodates the armature (30) in at least one end position.

The abovementioned locking unit, wherein an interior space (42) which is open on the piston side is formed in the latching unit (4) or in that portion (48) of the latching unit (4) which faces the piston (2).

The abovementioned locking unit, wherein an exterior space (406) is formed between latching unit (4) and housing (5) or between latching unit (4) and center section (6).

The abovementioned locking unit, wherein exterior space (406) and interior space (42) are fluidically connected via an equalizing opening (405) formed in the latching unit (4).

The abovementioned locking unit, wherein the exterior space (406) is vented by a channel (66a) which is formed in or on the center section (6).

The abovementioned locking unit, wherein the latching unit (4) is fixedly connected directly or indirectly to the housing (5).

The abovementioned locking unit, wherein a control element (43) which is fixedly connected to the armature rod (31) is arranged in the latching unit (4).

The abovementioned locking unit, wherein the control element (43) is at least partially movable within the portion (48) facing the piston (2).

The abovementioned locking unit, wherein a number of radial bores (45) for receiving the latching elements (40) are formed in the latching unit (4).

The abovementioned locking unit, wherein the latching elements (40) are of spherical design.

The abovementioned locking unit, wherein the control element (43) is designed in order, at least in one position, to push the latching elements (40) radially outward.

The abovementioned locking unit, wherein the latching elements (40), when they are pushed radially outward, come into engagement with one of the latching receptacles (20, 20a, 20b).

The abovementioned locking unit, wherein the piston (2) has at least two latching receptacles (20a, 20b) which are spaced apart axially from one another.

The abovementioned locking unit, wherein the piston (2) is lockable in two different positions by means of the two latching receptacles (20a, 20b).

The abovementioned locking unit, wherein the solenoid (3) has a solenoid core (36) which is arranged at one axial end of the locking device (1).

The abovementioned locking unit, wherein the armature rod (31) is guided in a bore of the solenoid core (36).

The abovementioned locking unit, wherein the piston (2) has a connecting region (203) which is on the end side axially and protrudes from the housing (5) even in the completely retracted state of the piston (2).

The abovementioned locking unit, wherein the connecting region (203) is designed in the manner of a fork.

The abovementioned locking unit, wherein the connecting region (203) is designed as a punched-out fork head.

The abovementioned locking unit, wherein the piston (2) or the piston thrust piece (26) is at least partially arranged radially between latching unit (4) and housing (5) or is arranged between latching unit (4) and center section (6).

The abovementioned locking unit, wherein the solenoid has a winding (31) for generating a magnetic field for moving the armature (30) and/or the armature rod (31).

The abovementioned locking unit, wherein the inner tube section (57) is designed as a guide of the piston (2).

The abovementioned locking unit, wherein the pressure conducting channel (71) is limited at least partially radially, with respect to the longitudinal axis (22) of the piston (2), on the inside by the outer side of the tube section (57) and on the outside by the inner wall (500) of the housing (5).

The abovementioned locking unit, wherein the tube section (57) is connected to the housing (5) or is part of the housing (5).

The abovementioned locking unit, wherein the piston (2) lies against the tube section (57).

The abovementioned locking unit, wherein the piston (2) slides along the tube section (57).

The abovementioned locking unit, wherein the piston (2) lies in a fluid-tight manner against the tube section (57).

The abovementioned locking unit, wherein the piston (2) has a sealing means which seals the piston (2) on the tube section (57) in a fluid-tight manner.

The abovementioned locking unit, wherein the sealing means is a sealing ring (209) or an O ring.

The abovementioned locking unit, wherein the sealing ring (209) or the O ring is provided in an encircling step (208) of the piston (2).

The abovementioned locking unit, wherein the sealing ring (209) or the O ring is provided in a piston thrust piece (26) of the piston (2).

The abovementioned locking unit, wherein the inner side of the tube section (57) forms a housing inner wall (56) against which the piston (2) lies.

The abovementioned locking unit, wherein the tube section (57) is of rectilinear and/or cylindrical design at least along a portion on which the piston (2) is guided.

The abovementioned locking unit, wherein the tube section (57) is formed from metal or from plastic.

The abovementioned locking unit, wherein the center section (6) is designed in the axial direction, with respect to the longitudinal axis (22) of the piston (2), to be shorter on the piston side than the latching unit (4) and in particular the radial bores (45) of the latching unit (4) are not concealed in the radial direction, with respect to the longitudinal axis (22) of the piston (2), by the center section (6).

The abovementioned locking unit, wherein the inner tube section (57) is connected in a fluid-tight manner to the housing (5).

The abovementioned locking unit, wherein the tube section (57) is accommodated in a groove (80) of the housing (5).

The abovementioned locking unit, wherein the groove (80) of the housing (5) is of annular design.

The abovementioned locking unit, wherein a seal (82, 83) is arranged between housing (5) and tube section (57).

The abovementioned locking unit, wherein the seal (82, 83) is arranged in the groove (80).

The abovementioned locking unit, wherein the seal (82) is an O ring or sealing ring.

The abovementioned locking unit, wherein the seal (83) is a sealing material or a silicone sealing material.

The abovementioned locking unit, wherein a number of bores (84) in which engagement parts (85) of the housing (5) engage is formed in the tube section (57).

The abovementioned locking unit, wherein the housing (5) has an in particular annular projection (81) which partially engages around the tube section (57).

The abovementioned locking unit, wherein the projection (81) limits the groove (80) radially on the inside.

The abovementioned locking unit, wherein the tube section (57) is connected to the housing (5) in a gas-tight and/or pressure-tight manner.

The abovementioned locking unit, wherein the housing (5) supports the tube section (57).

A method for producing a locking unit as described above, wherein the tube section is provided and the housing is insert molded around the tube section.

The abovementioned method, wherein a groove into which the tube section is subsequently introduced is formed in the housing.

The abovementioned method, wherein a number of bores is formed in the tube section, wherein a number of engagement parts which each engage in a bore has been formed or is formed in the housing.

The claims which are filed at this point with the application and claims filed later are without prejudice to the purpose of achieving further protection.

Should it be found here upon closer examination, in particular also of the relevant prior art, that one feature or another, although advantageous, is not absolutely imperative in relation to the aim of the invention, then, of course, the attempt will be made to achieve a wording which no longer has such a feature, in particular in the main claim. Such a sub-combination is also covered by the disclosure of this application.

It should also be noted that the refinements and variants of the invention that are described in the various embodiments and shown in the figures can be combined with one another in any desired manner. It is possible for individual features, or a number of features, to be interchanged as desired. These combinations of features are likewise disclosed here.

The dependency references given in the dependent claims relate to the further development of the subject matter of the main claim by means of the features of the respective dependent claim. However, these should not be understood as obviating the need to achieve independent substantive protection for the features of the appended dependent claims.

Features which have been disclosed only in the description, or also individual features from the claims which comprise a number of features, can at any time be adopted in the independent claim/claims as being of importance which is essential for the purpose of distinguishing the invention from the prior art, to be precise even when such features have been mentioned in conjunction with other features or achieve particularly advantageous results in conjunction with other features.

The invention claimed is:

1. A locking unit, in particular for a parking lock of an automatic transmission, for locking the movement of a piston which is movable by a drive and can be acted upon with pressure or hydraulic pressure, the locking unit having a solenoid and at least one latching element, and the at least one latching element interacting with an armature or an armature rod of the solenoid, and the piston having at least one latching receptacle, and the piston being securable by retaining interaction of the at least one latching element with the at least one latching receptacle, wherein the piston is at least partially mounted in a housing, and the locking unit has an internal tube section, the internal tube section being connected in a fluid-tight manner to the housing, wherein the internal tube section is accommodated in a groove of the housing, wherein the groove of the housing is a ring, and wherein a plurality of bores in which engagement parts of the housing engage is formed in the internal tube section.

2. The locking unit as claimed in claim 1, wherein the housing supports the internal tube section.

3. The locking unit as claimed in claim 1, wherein a pressure conducting channel is formed on an outer side of the internal tube section.

4. The locking unit as claimed in claim 1, wherein the piston is at least partially mounted in a center section which is at least partially surrounded by the housing, wherein the center section has an encircling contact shoulder on its side facing away from the solenoid or facing a piston tube of the piston, which contact shoulder is adjoined by an annular or conical connecting region, wherein the connecting region supports the internal tube section.

5. A method for producing the locking unit as claimed in claim 1, wherein the internal tube section is provided and the housing is insert-molded around the internal tube section.

6. The locking unit as claimed in claim 1, wherein a seal is arranged between the housing and the internal tube section, wherein the seal is arranged in the groove.

7. The locking unit as claimed in claim 6, wherein the seal is an o-ring or a sealing ring.

8. The locking unit as claimed in claim 6, wherein the seal is composed of a sealing material or a silicone sealing material.

9. A locking unit, in particular for a parking lock of an automatic transmission, for locking the movement of a piston which is movable by a drive and can be acted upon with pressure or hydraulic pressure, the locking unit having a solenoid and at least one latching element, and the at least one latching element interacting with an armature or an armature rod of the solenoid, and the piston having at least one latching receptacle, and the piston being securable by retaining interaction of the at least one latching element with the at least one latching receptacle, wherein the piston is at least partially mounted in a housing, and the locking unit has an internal tube section, the internal tube section being connected in a fluid-tight manner to the housing, wherein the internal tube section is provided and the housing is insert-molded around the internal tube section, wherein a plurality of bores is formed in the internal tube section, and wherein a plurality of engagement parts which each engage in a bore of the plurality of bores has been formed or is formed in the housing.

10. A locking unit, in particular for a parking lock of an automatic transmission, for locking the movement of a piston which is movable by a drive and can be acted upon with pressure or hydraulic pressure, the locking unit having a solenoid and at least one latching element, and the at least one latching element interacting with an armature or an armature rod of the solenoid, and the piston having at least one latching receptacle, and the piston being securable by retaining interaction of the at least one latching element with the at least one latching receptacle, wherein the piston is at least partially mounted in a housing, and the locking unit has an internal tube section, the internal tube section being connected in a fluid-tight manner to the housing, wherein a groove into which the internal tube section is introduced subsequently is formed in the housing, wherein a plurality of bores is formed in the internal tube section, and wherein a plurality of engagement parts which each engage in a bore of the plurality of bores has been formed or is formed in the housing.

\* \* \* \* \*